United States Patent
Loti et al.

(10) Patent No.: US 11,999,480 B2
(45) Date of Patent: *Jun. 4, 2024

(54) FLIGHT CONTROL SYSTEM FOR UNMANNED AERIAL VEHICLE AND TOPOGRAPHY MEASURING SYSTEM

(71) Applicants: TOPCON Corporation, Tokyo-to (JP); Tierra S.p.A, Turin (IT)

(72) Inventors: Riccardo Loti, Turin (IT); Kaoru Kumagai, Tokyo-to (JP)

(73) Assignees: TOPCON Corporation, Tokyo-to (JP); Tierra S.p.A, Turin (IT)

( * ) Notice: Subject to any disclaimer, the term of this patent is extended or adjusted under 35 U.S.C. 154(b) by 0 days.

This patent is subject to a terminal disclaimer.

(21) Appl. No.: 17/781,832

(22) PCT Filed: Dec. 3, 2020

(86) PCT No.: PCT/JP2020/044963
§ 371 (c)(1),
(2) Date: Jun. 2, 2022

(87) PCT Pub. No.: WO2021/112158
PCT Pub. Date: Jun. 10, 2021

(65) Prior Publication Data
US 2023/0010931 A1    Jan. 12, 2023

(30) Foreign Application Priority Data
Dec. 5, 2019 (JP) .................. 2019-220422

(51) Int. Cl.
*B64C 39/02*      (2023.01)
*B64D 47/08*      (2006.01)
(Continued)

(52) U.S. Cl.
CPC ............ *B64C 39/024* (2013.01); *B64D 47/08* (2013.01); *G01C 15/002* (2013.01); *G05D 1/101* (2013.01);
(Continued)

(58) Field of Classification Search
None
See application file for complete search history.

(56) References Cited

U.S. PATENT DOCUMENTS

2004/0179848 A1 * 9/2004 Belenkii .............. H04B 10/112
                                                                 398/131
2014/0371952 A1    12/2014 Ohtomo et al.
(Continued)

FOREIGN PATENT DOCUMENTS

CN    107885223 A    4/2018
EP    3460396 A    3/2019
(Continued)

OTHER PUBLICATIONS

International Search Report and Written Opinion dated Jun. 16, 2020 in co-pending PCT application No. PCT/JP2020/015126.
(Continued)

*Primary Examiner* — Jelani A Smith
*Assistant Examiner* — Davin Seol
(74) *Attorney, Agent, or Firm* — NIELDS, LEMACK & FRAME, LLC (57) ABSTRACT

A flight control system for an unmanned aerial vehicle comprises an unmanned aerial vehicle on which a reflector is mounted and a total station for tracking the reflector and for acquiring measurement data including three-dimensional coordinates of the reflector, wherein the total station comprises a tracking module for tracking the reflector, a TS-data transmitting module having an optical axis parallel or approximately parallel to a tracking optical axis of the (Continued)

tracking module and for emitting a TS-data transmitting light, and a TS-arithmetic control module, wherein the unmanned aerial vehicle has a photodetector for receiving the TS-data transmitting light and for emitting a photodetecting signal and a UAV-arithmetic control module for controlling a flight of the unmanned aerial vehicle, and wherein the TS-arithmetic control module is configured to superimpose the measurement data on the TS-data transmitting light, and the UAV-arithmetic control module is configured to separate the measurement data from the photodetecting signal and obtains a flight position of the unmanned aerial vehicle in real time.

18 Claims, 8 Drawing Sheets

(51) Int. Cl.
  *G01C 15/00* (2006.01)
  *G05D 1/00* (2006.01)
  *B64U 101/30* (2023.01)
(52) U.S. Cl.
  CPC .... *B64U 2101/30* (2023.01); *B64U 2201/104* (2023.01)

(56) References Cited

U.S. PATENT DOCUMENTS

| | | | |
|---|---|---|---|
| 2015/0147067 A1* | 5/2015 | Ryan | H05B 47/19 398/118 |
| 2015/0220085 A1 | 8/2015 | Ohtomo et al. | |
| 2018/0081056 A1* | 3/2018 | Ohtomo | G01C 15/002 |
| 2018/0147998 A1* | 5/2018 | Ohtomo | B60R 11/04 |
| 2018/0197421 A1 | 7/2018 | Ogawa et al. | |
| 2019/0086548 A1 | 3/2019 | Nishita et al. | |
| 2022/0013020 A1* | 1/2022 | Guetta | G05D 1/12 |
| 2022/0153413 A1 | 5/2022 | Riccardo et al. | |
| 2022/0335843 A1* | 10/2022 | Yoshida | B64F 1/36 |
| 2022/0404837 A1* | 12/2022 | Suzuki | G05D 1/102 |

FOREIGN PATENT DOCUMENTS

| | | |
|---|---|---|
| JP | 2015-1450 A | 1/2015 |
| JP | 2015-145784 A | 8/2015 |
| JP | 2018-44913 A | 3/2018 |
| JP | 2018-112445 A | 7/2018 |
| JP | 2018-138923 A | 9/2018 |
| JP | 2019-39868 A | 3/2019 |

OTHER PUBLICATIONS

International Preliminary Report on Patentability dated Sep. 28, 2021 in co-pending PCT application No. PCT/JP2020/015126.
European Communication and Search Report dated Oct. 27, 2022 (16-Pages).
International Preliminary Report on Patentability dated Jun. 16, 2022 in corresponding PCT application No. PCT/JP2020/044963.
International Search Report and Written Opinion dated Feb. 22, 2021 in corresponding PCT application No. PCT/JP2020/044963.

* cited by examiner

FLIGHT CONTROL SYSTEM FOR UNMANNED AERIAL VEHICLE AND TOPOGRAPHY MEASURING SYSTEM

TECHNICAL FIELD

The present invention relates to a flight control system for an unmanned aerial vehicle for transmitting a flight position of an unmanned aerial vehicle to the unmanned aerial vehicle in real time, and to a topography measuring system in which a shape measuring instrument is mounted on the unmanned aerial vehicle and which performs a topography measurement from the sky.

BACKGROUND ART

Recently, an unmanned aerial vehicle has become common and developed, and a photography, a small freight transport and the like are carried out using the unmanned aerial vehicle. The unmanned aerial vehicle is remotely operated in a visible state, or a position of the unmanned aerial vehicle is obtained by using a GPS and the unmanned flight is performed in accordance with a program as set. In this case, a real-time flight position of the unmanned aerial vehicle is not highly accurately required.

Further, a photogrammetry is widely carried out based on aerial photographs for a topography measurement. Further, recently, a method, in which a camera is mounted on an unmanned aerial vehicle, the ground is photographed from the sky by the camera, and the aerial photographs are acquired, has become widespread.

Further, in a case where a camera is mounted on an unmanned aerial vehicle, and the ground is photographed from the sky by the camera, there is a method is which a reflector is disposed on the unmanned aerial vehicle, this reflector is tracked by a total station, a position of the unmanned aerial vehicle is measured, a photographing position of the unmanned aerial vehicle is identified based on a measurement result and a topography measurement is performed based on the photographing position and the images.

Conventionally, positional data of an unmanned aerial vehicle is stored in a total station, photography data and after the end of the measurement, the positional data of the unmanned aerial vehicle are collated with each other, and then a topography measurement result is calculated. Therefore, measurement data cannot be seen in real time, and a judgment of a measurement state is made after a completion of a photographing by the unmanned aerial vehicle and after a position-measurement by the total station. For this reason, in a case where the measurement state is judged insufficient and a remeasurement is required, a measurement work must be again performed from the beginning, which results in a considerable loss of time.

Further, conventionally, since the positional data of the unmanned aerial vehicle is stored in the total station, a position measuring instrument as additionally required in order that the unmanned aerial vehicle itself to recognize its flight position in real time, and as a result, a configuration of a system is complicated.

CITATION LIST

Patent Literature

PTL1: Patent 2015-1450
PTL2: Patent 2015-145784

SUMMARY OF INVENTION

Technical Problem

In the present invention, in a total station and a flight control system for an unmanned aerial vehicle or a topography measuring system using the unmanned aerial vehicle, a system which enables to transmit a flight position of the unmanned aerial vehicle measured by the total station to the unmanned aerial vehicle in real time is provided.

Solution to Problem

The present invention relates to a flight control system for an unmanned aerial vehicle comprises an unmanned aerial vehicle on which a reflector is mounted and a total station for tracking the reflector and for acquiring measurement data including three-dimensional coordinates of the reflector, wherein the total station comprises a tracking module for tracking the reflector, a TS-data transmitting module having an optical axis parallel or approximately parallel to a tracking optical axis of the tracking module and for emitting a TS-data transmitting light, and a TS-arithmetic control module, wherein the unmanned aerial vehicle has a photodetector for receiving the TS-data transmitting light and for emitting a photodetecting signal and a UAV-arithmetic control module for controlling a flight of the unmanned aerial vehicle, and wherein the TS-arithmetic control module is configured to superimpose the measurement data on the TS-data transmitting light, and the UAV-arithmetic control module is configured to separate the measurement data from the photodetecting signal and to obtain a flight position of the unmanned aerial vehicle in real time.

Further, the present invention relates to the flight control system for an unmanned aerial vehicle, wherein the UAV-arithmetic control module is configured to control the flight of the unmanned aerial vehicle based on three-dimensional coordinates included in the measurement data.

Further, the present invention relates to the flight control system for an unmanned aerial vehicle, wherein the tracking module is configured to pulse-emit a tracking light in a predetermined cycle and to emit the TS-data transmitting light in a time period of each emission interval in such a manner that the TS-data transmitting light does not interfere with the tracking light and a reflected tracking light.

Further, the present invention relates to the flight control system for an unmanned aerial vehicle, wherein the tracking module is also used as a TS-data transmitting module, and the tracking module is configured to emit the tracking light as the TS-data transmitting light in the time period of each emission interval.

Further, the present invention relates to the flight control system for an unmanned aerial vehicle, wherein the photodetector includes the reflector and has a reflective film formed on a reflection surface of the reflector and for transmitting a part of a light, and a photodetection element for receiving the TS-data transmitting light through the reflective film.

Further, the present invention relates to a topography measuring system comprises an unmanned aerial vehicle, on which a reflector and a shape measuring instrument provided at a position known to the reflector are mounted, and a total station for tracking the reflector and for acquiring measurement data including three-dimensional coordinates of the reflector, wherein the total station comprises a tracking module for tracking the reflector, a TS-data transmitting module having an optical axis parallel or approximately parallel to a tracking optical axis of the tracking module and for emitting a TS-data transmitting light, and a TS-arithmetic control module, wherein the unmanned aerial vehicle has a photodetector for receiving the TS-data transmitting light and for emitting a photodetecting signal and a UAV-arithmetic control module for controlling a flight of the unmanned aerial vehicle, and wherein the TS-arithmetic control module is configured to superimpose the measurement data on the TS-data transmitting light, the UAV-arithmetic control module is configured to acquire topographical shape data by the shape measuring instrument, and the UAV-arithmetic control module is configured to separate the measurement data from the photodetecting signal, to obtain a position of the shape measuring instrument in real time, to associate the position of the shape measuring instrument with the topographical shape data, and to obtain three-dimensional coordinates of the shape measuring instrument at the time of acquiring the topographical shape data.

Further, the present invention relates to the topography measuring system, wherein the UAV-arithmetic control module is configured to control the flight of the unmanned aerial vehicle based on three-dimensional coordinates included in the measurement data.

Further, the present invention relates to the topography measuring system, wherein the tracking module is configured to pulse-emit a tracking light in a predetermined cycle and to emit the TS-data transmitting light in a time period of each emission interval in such a manner that the TS-data transmitting light does not interfere with the tracking light and a reflected tracking light.

Further, the present invention relates to the topography measuring system, wherein the tracking module is also used as a TS-data transmitting module, and the tracking module is configured to emit the tracking light as the TS-data transmitting light in the time period of each emission interval.

Further, the present invention relates to the topography measuring system, wherein the photodetector includes the reflector and has a reflective film formed on a reflection surface of the reflector and for transmitting a part of a light, and a photodetection element for receiving the TS-data transmitting light through the reflective film.

Further, the present invention relates to the topography measuring system, wherein the total station has a TS-GNSS device, the unmanned aerial vehicle has a UAV-GNSS device, wherein the TS-arithmetic control module is configured to obtain a GNSS time at the time of acquiring the measurement data by the TS-GNSS device and to associate the GNSS time with the measurement data, and wherein the UAV-arithmetic control module is configured to obtain a GNSS time at the time of acquiring shape data by the UAV-GNSS device, to associate the GNSS time with the shape data, and to associate the measurement data with the shape data through the GNSS time.

Further, the present invention relates to the topography measuring system, wherein the shape measuring instrument is a camera for photographing a ground surface, and the UAV-arithmetic control module is configured to perform a photogrammetry based on image data acquired by the camera and on three-dimensional coordinates, as obtained from the TS-data transmitting light, of the camera at the time of acquiring an image.

Further, the present invention relates to the topography measuring system, wherein the shape measuring instrument is a laser scanner for acquiring point cloud data, and the UAV-arithmetic control module is configured to convert the point cloud data into three-dimensional data of a ground surface system based on the point cloud data acquired by the laser scanner and on three-dimensional coordinates, as obtained from the TS-data transmitting light, of the laser scanner at the time of acquiring the point cloud data.

Further, the present invention relates to a topography measuring system comprising: an unmanned aerial vehicle, on which a reflector and a shape measuring instrument provided at a position known to the reflector are mounted, and a total station for tracking the reflector and for acquiring measurement data including three-dimensional coordinates of the reflector, wherein the total station comprises a tracking module for tracking the reflector and a TS-arithmetic control module, wherein the unmanned aerial vehicle has a UAV-data transmission module for emitting a UAV-data transmitting light and a UAV-arithmetic control module for controlling the flight of the unmanned aerial vehicle, wherein the UAV-arithmetic control module is configured to acquire shape data by the shape measuring instrument and to superimpose the shape data on the UAV-data transmitting light, and the TS-arithmetic control module is configured to acquire the shape data from the UAV-data transmitting light, to associate the shape data with the measurement data, and to acquire three-dimensional coordinates of the shape measuring instrument at the time of acquiring the shape data.

Further, the present invention relates to the topography measuring system, wherein the total station has a TS-GNSS device, the unmanned aerial vehicle has a UAV-GNSS device, the UAV-arithmetic control module is configured to acquire a GNSS time at the time of acquiring the shape data by the UAV-GNSS device and to associate the GNSS time with the shape data, and the TS-arithmetic control module is configured to acquire a GNSS time at the time of acquiring the measurement data by the TS-GNSS device, to associate the GNSS time with the measurement data, and associate the measurement data with the shape data through the GNSS time.

Further, the present invention relates to the topography measuring system, wherein the shape measuring instrument is a camera for photographing a land surface, and the TS-arithmetic control module is configured to acquire three-dimensional coordinates of the camera at the time of acquiring an image based on the measurement data and to perform the photogrammetry from the image data and the three-dimensional coordinates.

Further, the present invention relates to the topography measuring system, wherein the shape measuring instrument is a laser scanner for acquiring point cloud data of a land surface, and the TS-arithmetic control module is configured to convert the point cloud data into the three-dimensional data of the land surface system based on the point cloud data and three-dimensional coordinates of the laser scanner as obtained from the measurement data at the time of acquiring the point cloud data.

Advantageous Effects of Invention

According to the present invention, the flight control system for an unmanned aerial vehicle comprises an unmanned aerial vehicle on which a reflector is mounted and a total station for tracking the reflector and for acquiring measurement data including three-dimensional coordinates of the reflector, wherein the total station comprises a tracking module for tracking the reflector, a TS-data transmitting module having an optical axis parallel or approximately parallel to a tracking optical axis of the tracking module and for emitting a TS-data transmitting light, and a TS-arithmetic control module, wherein the unmanned aerial vehicle has a photodetector for receiving the TS-data transmitting light and for emitting a photodetecting signal and a UAV-arithmetic control module for controlling a flight of the unmanned aerial vehicle, and wherein the TS-arithmetic control module is configured to superimpose the measurement data on the TS-data transmitting light, and the UAV-arithmetic control module is configured to separate the measurement data from the photodetecting signal and to obtain a flight position of the unmanned aerial vehicle in real time. As a result, the unmanned aerial vehicle is capable of flying based on a highly accurate positional information measured by the total station while flying.

Further, according to the present invention, the topography measuring system comprises an unmanned aerial vehicle, on which a reflector and a shape measuring instrument provided at a position known to the reflector are mounted, and a total station for tracking the reflector and for acquiring measurement data including three-dimensional coordinates of the reflector, wherein the total station comprises a tracking module for tracking the reflector, a TS-data transmitting module having an optical axis parallel or approximately parallel to a tracking optical axis of the tracking module and for emitting a TS-data transmitting light, and a TS-arithmetic control module, wherein the unmanned aerial vehicle has a photodetector for receiving the TS-data transmitting light and for emitting a photodetecting signal and a UAV-arithmetic control module for controlling a flight of the unmanned aerial vehicle, and wherein the TS-arithmetic control module is configured to superimpose the measurement data on the TS-data transmitting light, the UAV-arithmetic control module is configured to acquire topographical shape data by the shape measuring instrument, and the UAV-arithmetic control module is configured to separate the measurement data from the photodetecting signal, to obtain a position of the shape measuring instrument in real time, to associate the position of the shape measuring instrument with the topographical shape data, and to obtain three-dimensional coordinates of the shape measuring instrument at the time of acquiring the topographical shape data. As a result, it is possible for the unmanned aerial vehicle to obtain a highly accurate positional information measured by the total station while flying, and it is possible to perform a topography measurement with high accuracy based on this positional information.

Further, according to the present invention, the topography measuring system comprises an unmanned aerial vehicle, on which a reflector and a shape measuring instrument provided at a position known to the reflector are mounted, and a total station for tracking the reflector and for acquiring measurement data including three-dimensional coordinates of the reflector, wherein the total station comprises a tracking module for tracking the reflector and a TS-arithmetic control module, wherein the unmanned aerial vehicle has a UAV-data transmission module for emitting a UAV-data transmitting light and a UAV-arithmetic control module for controlling the flight of the unmanned aerial vehicle, wherein the UAV-arithmetic control module is configured to acquire shape data by the shape measuring instrument and to superimpose the shape data on the UAV-data transmitting light, and the TS-arithmetic control module is configured to acquire the shape data from the UAV-data transmitting light, to associate the shape data with the measurement data, and to acquire three-dimensional coordinates of the shape measuring instrument at the time of acquiring the shape data. As a result, it is possible to sequentially confirm measurement results provided by the shape measuring instrument on the TS side, and to determine remeasurement.

DESCRIPTION OF EMBODIMENTS

A description will be given below on an embodiment of the present invention by referring to the attached drawings.

Figure 1:
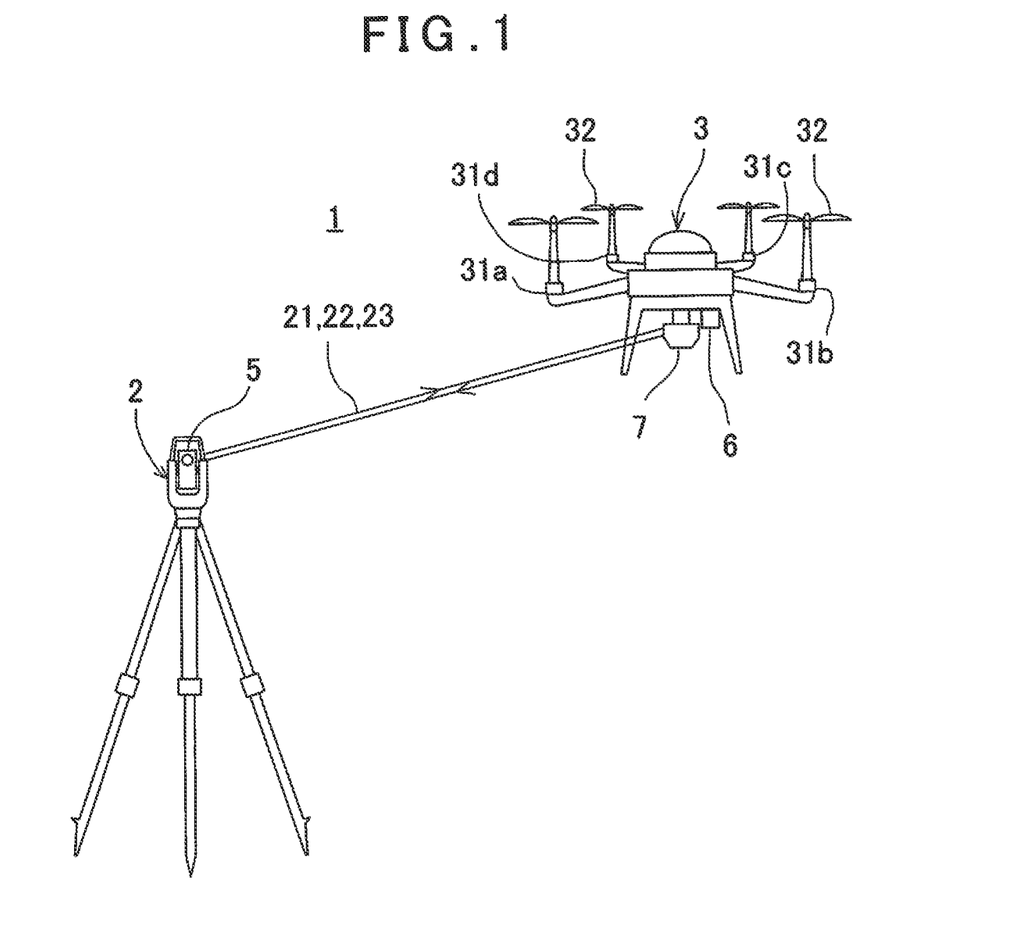
FIG. 1 A schematical block diagram of a first embodiment of the present invention.

FIG. 1 is a schematic drawing of an aerial photogrammetry system using a data transmission method according to the present invention in the first embodiment.

An aerial photogrammetry system 1 is constituted of a surveying instrument with a tracking function and an unmanned aerial vehicle (UAV 3).

In the following description, a total station is used as a surveying instrument 2 with a tracking function.

The total station 2 is installed at a known point (point at which three-dimensional coordinates are known). The total station 2 has a telescope module 5, which is rotatable in a horizontal direct on and a vertical direction, and is capable of sighting an object to be measured and performing an electro-optical distance measurement. Further, a vertical angle and a horizontal angle of the telescope module 5 are detected by a vertical angle detector and a horizontal angle detector respectively, and three-dimensional coordinates of the object to be measured can be determined based on the detected vertical angle and horizontal angle and a distance measurement result.

Further, the telescope module 5 has a tracking function and is capable of measuring the object to be measured while tracking an object to be measured with retroreflective characteristics (for instance, a prism 7). Further, since the object to be measured is measured by the total station 2, an obtained measurement result (three-dimensional coordinates) is highly accurate.

The UAV 3 is capable of performing a flight based on a remote operation or an unmanned flight (the autonomous flight), and has a camera 6 for performing a photogrammetry. In this case, the camera 6 functions as a shape measuring instrument, and images (image data) acquired by the camera 6 correspond to shape data. As the positional data of the UAV 3 required for the UAV 3 to perform the autonomous flight, it is possible to use a measurement result (to be described later) of the UAV 3 by the total station or the positional data acquired by a UAV-GNSS device 27 (to be described later).

The camera 6 has an image pickup optical axis which becomes vertical when the UAV 3 is in a horizontal attitude. Alternatively, the camera 6 is provided on the UAV 3 via a gimbal mechanism and set in such a manner that the image pickup optical axis always becomes vertical irrespective of an attitude of the UAV 3. As the camera 6, a camera or a video camera, which enables to acquire digital images, is used, and the camera 6 enables to acquire still images and continuous images.

Further, the UAV 3 has a reflector with retroreflective characteristics provided on a lower surface thereof as an object to be measured. As the reflector, an omnidirectional prism 7 is preferably used. A relationship between an optical reference position of the prism 7 and an optical reference position of the camera 6 is fixed, and a positional relationship is known. Further, a reference optical axis of the prism 7 is parallel to an image pickup optical axis of the camera 6.

Figure 2:
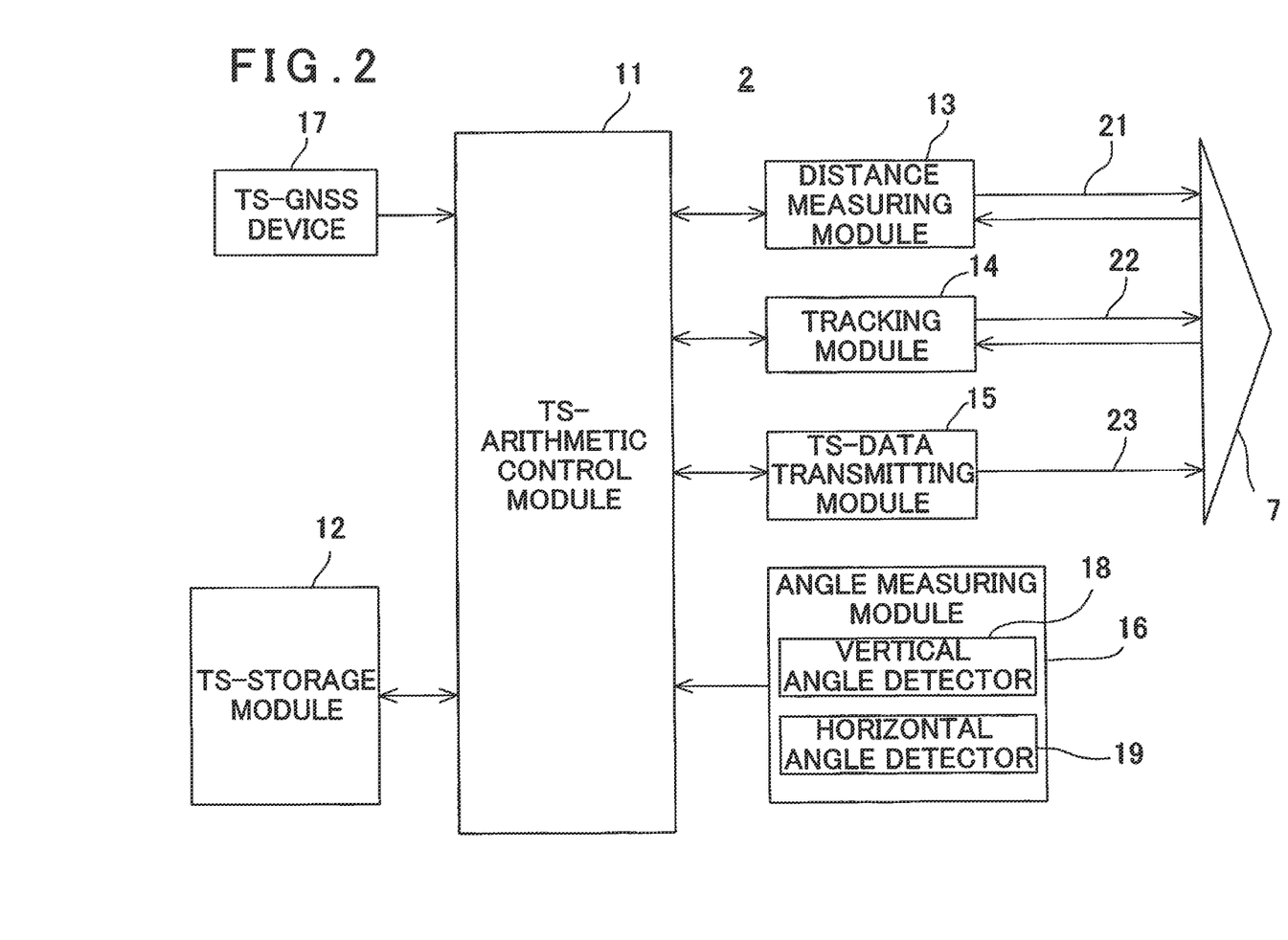
FIG. 2 A schematical block diagram of a total station used in the first embodiment.

In FIG. 2, a description will be given on an outline of the total station 2.

The total station 2 mainly comprises a TS-arithmetic control module 11, a TS-storage module 12, a distance measuring module 13, a tracking module 14, a TS-data transmitting module 15, an angle measuring module 16 and a TS-GNSS device 17.

The distance measuring module 13 functions as an electronic distance meter, projects a distance measuring light 21 toward the object to be measured, receives the distance measuring light 21 reflected on the object to be measured and measures a distance to the object to be measured based on a time difference between a projection timing and a photodetection timing and on a light velocity. Further, the distance measuring module 13 is controlled by the TS-arithmetic control module 11, and a measurement result obtained by the distance measuring module 13 is input to the TS-arithmetic control module 11. It is to be noted that, as the distance measuring light 21, a pulsed light is used.

As the TS-arithmetic control module 11, a CPU dedicated to this apparatus, a general-purpose CPU, an embedded CPU, a microprocessor, or the like is used. A receiving signal is input from the TS-GNSS device 17 to the TS-arithmetic control module 11, and the TS-arithmetic control module 11 acquires a time signal (a GNSS time) from the receiving signal. Further, the TS-arithmetic control module 11 associates a distance measurement result with a CUSS time in the distance measurement.

The tracking module 14 has an optical axis (tracking optical axis) which is parallel or approximately parallel to an optical axis (distance measuring optical axis) of the distance measuring module 13 and irradiates a tracking light 22 to an object to be tracked (that is, the object to be measured) at a timing which is the same as or approximately the same as a timing of irradiating the distance measuring light 21. It is to be noted that, as the tracking light 22, a pulsed light is used.

Further, the tracking module 14 has a photodetection module (not shown) for receiving the tracking light 22 reflected on the object to be tracked. The photodetection module has a tracking photodetection shutter (not shown) which restricts or inhibits a photodetection of the reflected tracking light. Further, as to the photodetection module, a deviation of the photodetection module from a reference position is obtained based on a position of the reflected tracking light on the photodetection module, and a photodetection result of the photodetection module is input to the TS-arithmetic control module 11, and the TS-arithmetic control module 11 controls a vertical angle and a horizontal angle of the telescope module 5 so that the photodetection position coincides with the reference position.

Further, the photodetecting signal of the photodetecting module of the distance measuring module 13 and the photodetecting signal of the tracking module 14 are optically separated by changing their wavelengths so that the photodetecting signals do not interfere with each other. For instance, a red light is used as the distance measuring light 21 and an infrared light is used as the tracking light 22, lights having different wavelengths are used as the distance measuring light 21 and the tracking light 22, and the distance measuring light 21 and the tracking light 22 are separated from each other by a wavelength selecting film or a wavelength selecting filter.

The TS-data transmitting module 15 has an optical axis (transmitting optical axis), which is parallel or approximately parallel to the distance measuring optical axis or the tracking optical axis, emits a TS-data transmitting light 23 in a time period during which the tracking light 22 is not emitted, and irradiates the TS-data transmitting light 23 on the transmitting optical axis. That is, the TS-data transmitting module 15 emits the TS-data transmitting light 23 in a time period during when the photodetection of the photodetecting module of the tracking module 14 is limited or prohibited by the tracking photodetecting shutter in such a manner that the tracking light 22, the reflected light of the tracking light 22 and the TS-data transmitting light 23 do not interfere with each other.

The TS-arithmetic control module 11 controls the emission of the TS-data transmitting light 23 in such a manner that the measurement data measured by the total station 2 is superimposed on the TS-data transmitting light 23. As a method for superimposing the measurement data on the TS-data transmitting light 23, the TS-data transmitting light 23 is optically modulated. As another method, the TS-data transmitting light 23 is pulse-emitted, and the measurement data is superimposed by an ON/OFF control over the pulsed light.

It is to be noted that the GNSS time is associated with the distance measurement data which is to be superimposed on the TS-data transmitting light 23.

The angle measuring module 16 has a vertical angle detector 18 and a horizontal angle detector 19, and detects a sighting direction of the telescope module 5, that is, a vertical angle and a horizontal angle of the distance measuring optical axis. It is to be noted that a synthesized angle of the vertical angle and the horizontal angle will be referred to as a directional angle, which indicates a direction of the distance measuring optical axis.

The vertical angle and the horizontal angle are input to the TS-arithmetic control module 11, and the TS-arithmetic control module 11 determines three-dimensional coordinates of the object to be measured or a measuring point based on the vertical angle, the horizontal angle and on a distance measurement result of the distance measuring module 13.

As the TS-storage module 12, a semiconductor storage module is used, such as a RAM, a ROM, a Flash ROM, a DRAM, a memory card, or a USB memory.

In the TS-storage module 12, various kinds of programs are stored. These programs include a control program configured to control the distance measuring module 13, the tracking module 14 and the TS-data transmitting module 15 respectively or configured to synchronously control the distance measuring module 13, the tracking module 14 and the TS-data transmitting module 15, and further include a distance measurement program configured to make the distance measuring module 13 carry out a distance measurement, a tracking program configured to make the tracking module 14 carry out a tracking, a data transmission program configured to make the TS-data transmitting module 15 transmit data, an angle measurement program configured to make the angle measuring module 16 carry out an angle measurement, a calculation program configured to calculate the three-dimensional coordinates based on distance measurement data acquired by the distance measuring module 13 and angle measurement data acquired by the angle measuring module 16, a program configured to associate the distance measurement data, the angle measurement data and a GNSS time acquired from the TS-GNSS device with each other and other programs.

Further, in the TS-storage module 12 are stored the distance measurement data acquired by the distance measuring module 13, the angle measurement data acquired by the angle measuring module 16 and three-dimensional data of the measuring point or the object to be measured. The distance measurement data, the angle measurement data and the three-dimensional coordinate data will be generally referred to as measurement data hereinafter. Therefore, the measurement data is associated with the GNSS time.

Figure 3:
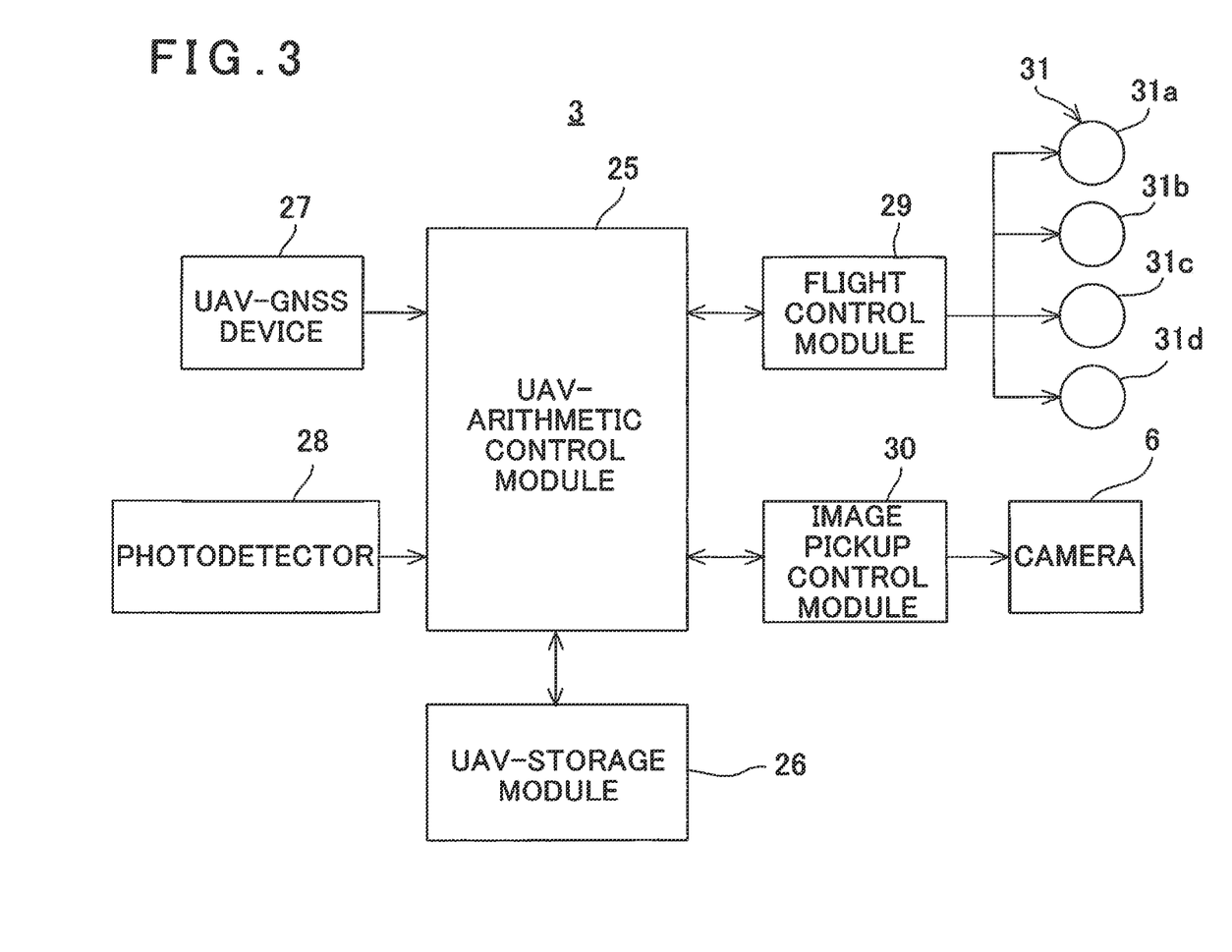
FIG. 3 A schematical block diagram of a UAV used in the first embodiment.

FIG. 3 shows an outline of the UAV 3.

The UAV 3 mainly comprises a UAV-arithmetic control module 25, a UAV-storage module 26, a UAV-GNSS device 27, a photodetector 28, a flight control module 29 and an image pickup control module 30.

Further, the UAV 3 has the necessary number of flight motors 31 (four flight motors 31a, 31b, 31c and 31d are shown in the drawing) controlled by the flight control module 29 and the propellers 32 rotated by the flight motors 31 respectively. Further, the UAV 3 has the camera 6 of which photographing operation is controlled by the image pickup control module 30.

As the UAV-arithmetic control module 25, a CPU dedicated to this apparatus, a general-purpose CPU, an embedded CPU, a microprocessor, or the like is used. The UAV-arithmetic control module 25 executes various kinds of programs stored in the UAV-storage module 26, performs various kinds of arithmetic operations, or performs the integrated control of the flight control module 29 or the image pickup control module 30.

It is to be noted that a part of the functions of the UAV-arithmetic control module 25 may be assigned to the flight control module 29 and the image pickup control module 30.

As the UAV-storage module 26, a semiconductor storage device is used such as a RAM, a ROM, a Flash ROM, DRAM, memory card or a USB memory or the like.

In the UAV-storage module 26, various kinds of programs are stored. The programs include a flight control program for controlling the flight, a flight plan program for performing the autonomous flight, an arithmetic program for performing the photogrammetry, an image pickup control program for controlling the image pickup control module 30, a program for acquiring a GNSS time from the UAV-GNSS device 27 and add a photographing time based on the GNSS time to a photographing image of the camera 6, a program for associating the measurement data transmitted from the TS-data transmission module 15 with the image data acquired by the camera 6 based on the GNSS time, a program for performing the photogrammetry based on the image data, the measurement data and for measuring the topography, and the like.

By referring to FIG. 4, a description will be given on the photodetector 28.

The photodetector 28 mainly has a prism module 35 and an amplifier 36.

The prism module 35 has a prism 7 which retro-reflecting an incoming light and photodetection elements 37 provided on a reflecting surface of the prism 7. The prism 7 has a plurality of reflecting surfaces, and the incoming light is usually several times reflected on the plurality of reflecting surfaces. In an illustrated example, a state where the incoming light is reflected on two reflecting surfaces twice and retro-reflected. Further, in the illustrated example, partially transmissive reflective films 38 are formed on the two reflecting surfaces respectively, and the photodetection elements 37 are provided on the respective reflecting surfaces. The reflective films 38 have optical characteristics to reflect a large part of the incoming light and to transmit a very small part of the incoming light and, for instance, with respect to a tracking light, the reflective films 38 have optical characteristics to transmit 10% of the incoming tracking light and to reflect 90% of the incoming tracking light. Further, with respect to a measuring light, the reflective films 38 have characteristics to reflect 100% of the distance measuring light and characteristics to transmit 10% of a TS-data transmitting light 23.

Therefore, when the tracking light enters the prism module 35, 90% of the tracking light is retro-reflected, and 10% of the light is transmitted through the reflective films 38 and is detected by the photodetection elements 37. The photodetection elements 37 output a photodetection signal, and the photodetection signal is amplified by the amplifier 36 and input to the UAV-arithmetic control module 25. It is to be noted that the photodetection signal may be amplified within the UAV-arithmetic control module 25. It is to be noted that the plurality of prisms may be horizontally and radially aligned so that the detection is possible from any direction in 360 degrees.

A description will be given below on actions by referring to FIG. 5.

The prism 7 is sighted by the telescope module 5, the distance measuring light 21 is irradiated, the distance measuring light 21 is retro-reflected by the prism 7, the reflected distance measuring light is received by the distance measuring module 13, and the distance measurement and the angle measurement are carried out. Further, the tracking light 22 and the TS-data transmitting light 23 are irradiated. Since the tracking light 22, the TS-data transmitting light 23 and the distance measuring light 21 have the same optical axis or approximately the same optical axis, both the tracking light 22 and the TS-data transmitting light 23 enter the prism 7.

The tracking light 22 is retro-reflected by the prism 7, the reflected tracking light is received by the tracking module 14, and the prism 7 is tracked, that is, the UAV 3 is tracked.

Figure 5:
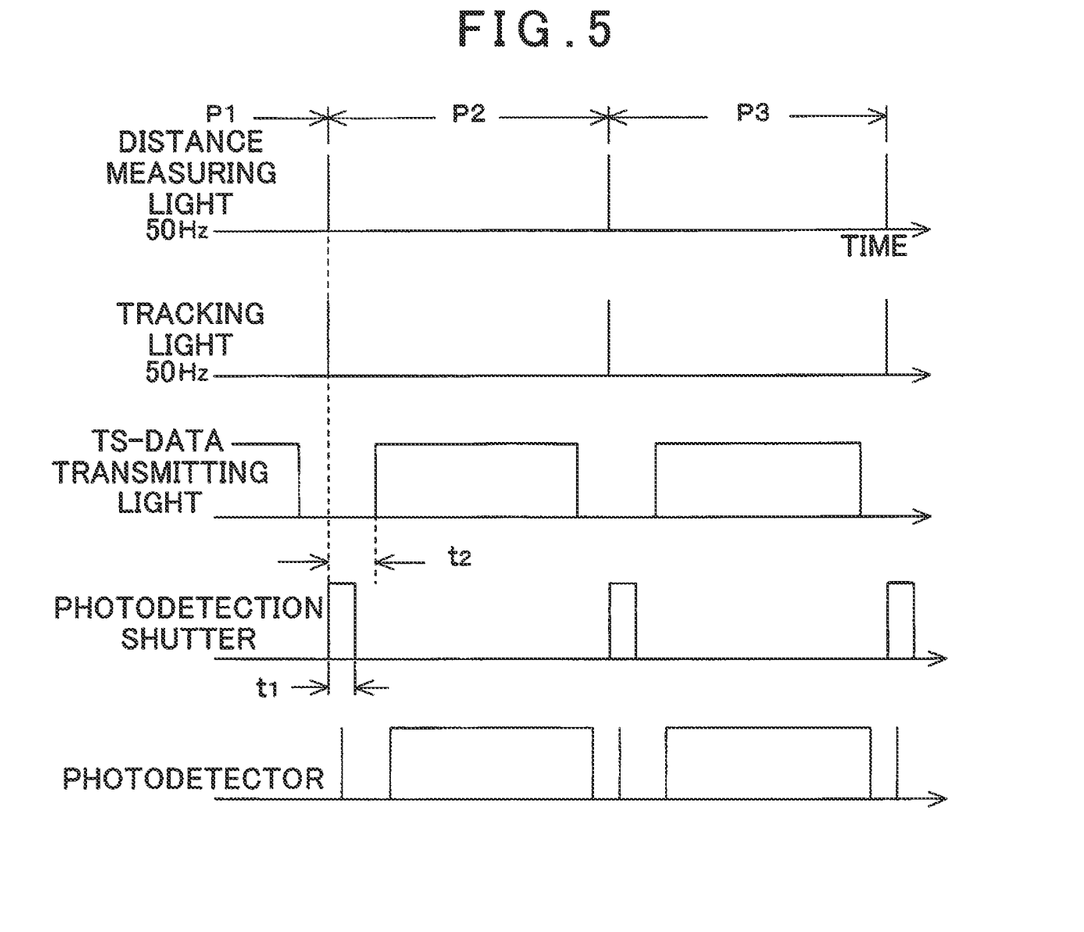
FIG. 5 An explanatory drawing to show light emission timings of a distance measuring light, a tracking light and a TS-data transmitting light, an operation timing of a photodetection shutter and a photodetection timing of the photodetector.

As shown in FIG. 5, both the distance measuring light 21 and the tracking light 22 are pulsed lights and emitted at the same timing. An emission cycle of the pulsed lights is, for instance, 50 Hz. Further, a shutter provided to the tracking module 14 is opened for a predetermined time "t1" from the emission timing of the tracking light 22, and the photodetecting module of the tracking module 14 is capable of receiving the reflected light of the tracking light 22. The distance measuring light 21 does not interfere with the tracking light 22 since the distance measuring light 21 has a different wavelength, and the distance measuring light 21 is received by the distance measuring module 13 after a predetermined time from the emission timing of the distance measuring light 21. As described above, since the reflected lights of the distance measuring light 21 and the tracking light 22 are optically separated from each other, there arises no problem even if the reflected lights are received at the same timing.

The predetermined time "t1" is set longer than a round-trip time from when the tracking light 22 is emitted to when the tracking light 22 returns as reflected by the prism 7 (object to be measured).

The TS-data transmitting light 23 is emitted in a time period from when a time "T2" (>"t1") elapses from the emission timing to when a next pulsed light is emitted. On this TS-data transmitting light 23, the measurement data obtained by measuring in a previous time period is superimposed. For instance, on the TS-data transmitting light 23 as emitted in a period "P2" in FIG. 5, the measurement data measured by the distance measuring light emitted in a period "P1" is superimposed.

It is to be noted that the emission cycle of the pulsed lights is determined by a processing speed (reaction speed) of the photodetection elements. For instance, regarding the tracking module 14, as a photodetection element used in the photodetecting module of the tracking module 14, a CCD or a CMOS, which is an aggregate of pixels, is used, however since outputs of the pixels are sequentially checked one by one in the detection of the reflected tracking light, the next pulsed light cannot be received until the check of all the pixels is completed. Therefore, the emission cycle of the pulsed lights is determined by a response performance of the photodetection element. When a general photodetection sensor used in a commercially available digital camera or video camera is used, the emission cycle of the pulsed light is approximately 50 Hz. It is to be noted that, in the present embodiment, the emission cycle of approximately 50 Hz brings about a sufficient effect.

Since the TS-data transmitting light 23 is emitted in the time period during which the shutter is closed, even if a reflected TS-data transmitting light reflected by the prism 7 enters the tracking module 14, the reflected TS-data transmitting light does not interfere with a tracking photodetecting signal.

A part of the TS-data transmitting light 23, which enters the prism 7, is transmitted through the reflective films 38 and received by the photodetection elements 37. The photodetecting signal output from the photodetection elements 37 is amplified by the amplifier 36 and is input to the UAV-arithmetic control module 25.

Here, the distance measuring light 21 and the tracking light 22 enter the photodetection elements 37, but a waveform of the photodetection signal output from the photodetection elements 37 can be easily identified since wavelengths of the distance measuring light 21 and the tracking light 22 are different from wavelength of the TS-data transmitting light 23.

The UAV-arithmetic control module 25 separates the superimposed measurement data from the photodetection signal. The measurement data is the data of three-dimensional coordinates of the prism 7, that is, the camera 6, and is associated with a GNSS time. Further, the UAV-arithmetic control module 25 controls the flight of the UAV 3 based on the separated measurement data. Further, the separated measurement data is stored in the UAV-storage module 26.

The image pickup control module 30 acquires images of the ground by the camera 6 at a predetermined time interval during the flight of the UAV 3. Further, the UAV-arithmetic control module 25 acquires a GNSS time at the time of acquiring the image data from the UAV-GNSS device 27, identifies a time of photographing of the camera 6 by the GNSS time and associates the acquired images with the GNSS time. Further, the three-dimensional coordinates of the prism 7 as determined by the total station 2, that is, the three-dimensional coordinates of the UAV 3, are transmitted to the UAV 3 substantially in real time, and the three-dimensional coordinates are linked (associated) with the GNSS time.

Image data associated with the GNSS time is stored in the UAV-storage module 26. The UAV-arithmetic control module 25 carries out the photogrammetry based on the image data and the measurement data stored in the UAV-storage module 26 and on the positional data transmitted from the total station 2.

Based on a GNSS time at which the image data was acquired, the UAV-arithmetic control module 25 retrieves or interpolates the positional data transmitted from the total station, which coincides with the GNSS time, and identifies three-dimensional coordinates at which the image data was acquired. Thus, each image data becomes the data with three-dimensional coordinates, and the UAV-arithmetic control module 25 performs the photogrammetry based on the image data. A result of the photogrammetry is stored in the UAV-storage module 26.

While carrying out the photogrammetry, the UAV-arithmetic control module 25 judges whether the result of the photogrammetry has an abnormality at the same time. Therefore, the judgment on the abnormality in the photogrammetry can be made during the flight.

In a case where the abnormality in the result of the photogrammetry is judged, with respect to a position (region) where the abnormality is judged, a photographing and a measuring by the total station 2 are carried out again. Therefore, the remeasurement can be carried out in a minimum time.

Further, since the photogrammetry is carried out while flying, the acquisition of necessary data is completed when the UAV 3 finishes a planned flight, and the measurement can be efficiently performed.

Further, since the three-dimensional coordinates of the prism 7 as determined by the total station 2, that is, the three-dimensional coordinates of the UAV 3 are transmitted to the UAV 3 substantially in real time, the UAV 3 can recognize its own flight position substantially in real time.

Therefore, if a flight plan, a surveying plan, and/or the like are stored in the UAV-storage module 26 in advance, the UAV-arithmetic control module 25 enables a highly precise autonomous flight of the UAV 3 in accordance with the flight plane or the surveying plane based on a flight control program, a flight plan program, and three-dimensional coordinates of the UAV 3 which are transmitted from the total station. The autonomous flight enables performing the survey without the remote control.

In the embodiment as described above, the photodetector 28 has the prism module 35 and the amplifier 36, and the prism module 35 is constituted of the prism 7, the reflective films 38 and the photodetection elements 37 which are provided on the reflection surfaces of the prism 7, but a partial reflection mirror which reflects a part of the TS-data transmitting light 23 may be provided on an optical path of the TS-data transmitting light 23, and it may be so designed that the reflected light reflected by the reflection mirror is detected by the photodetection elements.

Further, the photodetector 28 may be separated from the prism 7. That is, an optical system which receives only the TS-data transmitting light 23 may be provided, and the TS-data transmitting light 23 may be received by the photodetection elements 37 through the optical system.

Further, in the above embodiment, the TS-data transmission module 15 is provided separately from the tracking module 14, but a data transmitting function may be added to the tracking module 14 and the tracking module 14 also serves as the TS-data transmission module 15, and thereby the TS-data transmission module 15 may be omitted.

Since a pulsed light emitted in a predetermined cycle can suffice as the tracking light required for the tracking, the tracking light is additionally emitted in a time segment between the pulsed lights, and the measurement data is superimposed on the tracking light. That is, the tracking light with the measurement data superimposed thereon is emitted in the time segment, and the tracking light is used as the data transmitting light.

Further, in the embodiment as described above, the camera is used as a shape measuring instrument which measures a shape of the ground, but a laser scanner may be used as the shape measuring instrument instead of the camera. In a case where the laser scanner is used, point cloud data (scanner data) is acquired as data for measuring the shape of the ground.

By obtaining a position of the laser scanner at the time of acquiring the point cloud data from the data transmitting light 23, it is possible to convert the point cloud data into three-dimensional coordinates of a ground surface system (with reference to the total station 2).

Furthermore, the present embodiment may be configured as a system wherein the shape measuring instrument may be omitted, and an accurate flight position of the UAV 3, as measured by the total station, is transmitted from the total station to the UAV 3 substantially in real time and the autonomous flight of the UAV 3 becomes possible.

In this case, a distance which the light reaches is 1 km or more, and the autonomous flight in a wide area is possible. Further, as the structures required for the data transmission, the structures comprised in the total station can be used, and the system configuration is simple.

A description will be given on a second embodiment by referring to FIG. 6 to FIG. 9.

Figure 6:
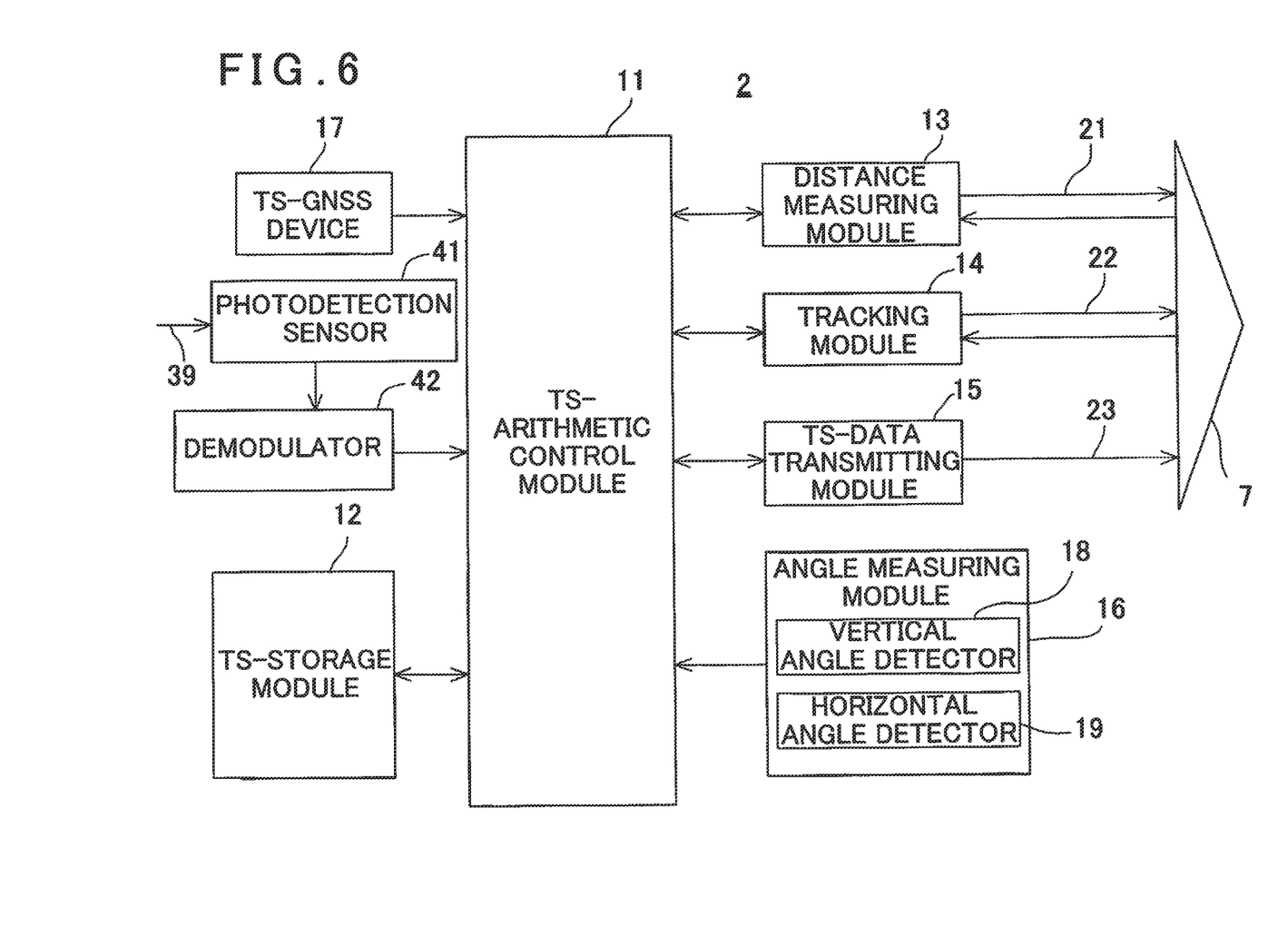
FIG. 6 A schematic block diagram of a total station used in a second embodiment 7
Figure 7:
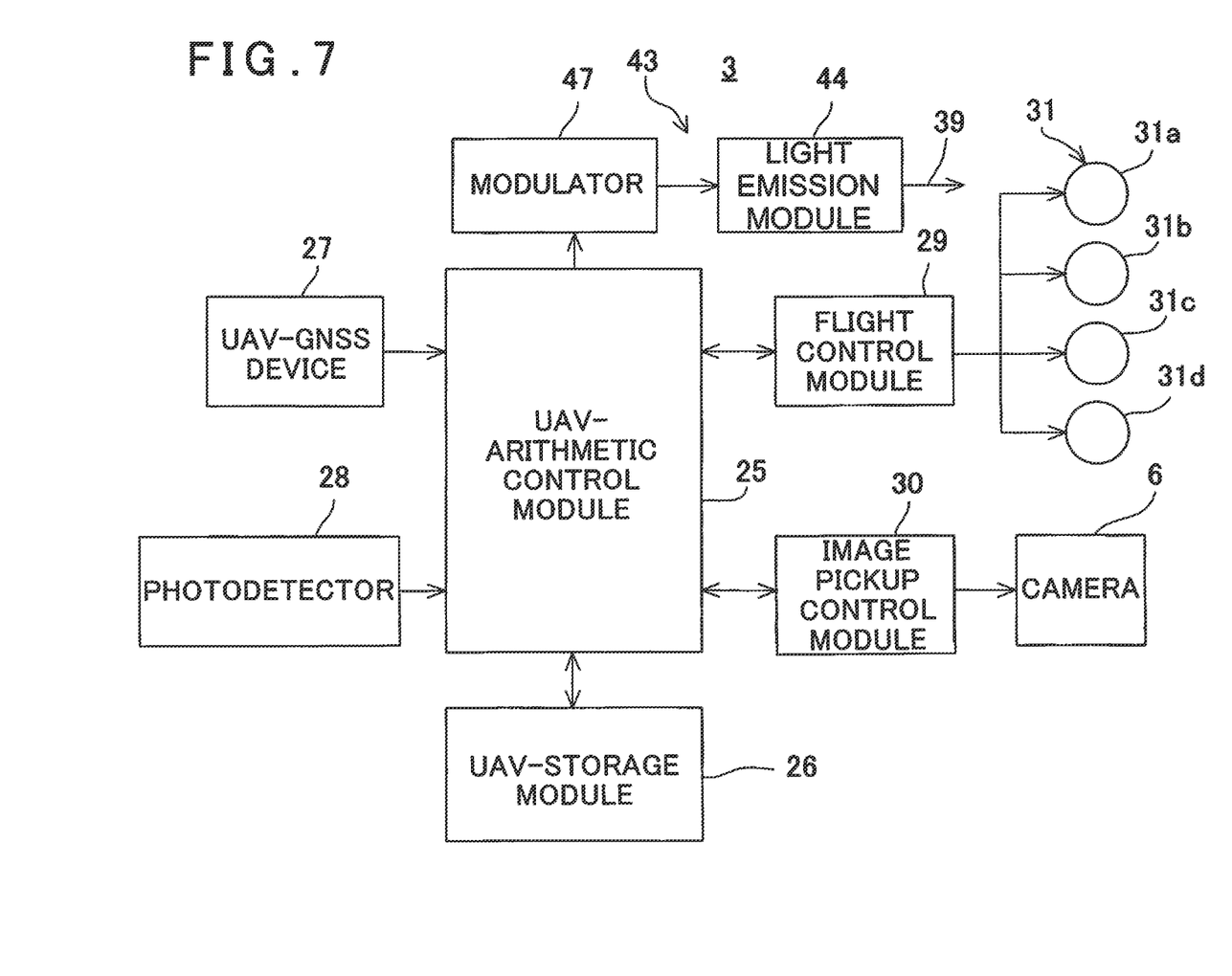
FIG. 7 A schematic block diagram of a UAV used in the second embodiment.

In the embodiment as described above, the UAV-arithmetic control module 25 of the UAV 3 associates the measurement data transmitted to the UAV 3 with the image data acquired by the UAV 3 and stores in the UAV-storage module 26, but the image data acquired by the UAV 3 may be transmitted to the total station 2, and the image data may be associated with the measurement data in the total station 2 and the image data and the measurement data may be stored in the TS-storage module 12.

It is to be noted that, in FIG. 6 and FIG. 7, like reference numerals denote parts equal or equivalent to those shown in FIG. 2 and FIG. 3, and a description thereof will be omitted.

Further, a retro-reflector of the UAV 3 is tracked by the total station 2, and a flight position of the UAV 3 is acquired, which is equal to the first embodiment.

The total station 2 has a photodetection sensor 41 which receives a UAV-data transmitting light 39 (to be described later) from the UAV 3, and a demodulator 42 which demodulates a photodetection signal output from the photodetection sensor 41 and separates a superimposed signal. A signal separated by the demodulator 42 is input to the TS-arithmetic control module 11 and stored in the TS-storage module 12. It is to be noted that the superimposed signal is the image data acquired by the camera 6 or the scanner data (the shape data) as described later.

Various kinds of programs described above are stored in the TS-storage module 12. Further, in the TS-storage module 12 are stored a data processing program for associating a signal detected by the demodulator 42 with the measurement data acquired by the total station 2 based on a GNSS time, and a program for performing a photogrammetry based on the image data or the measurement data and for performing a topography measurement.

The UAV 3 has a UAV-data transmission module 43 for emitting a data transmitting light 39. The UAV-data transmission module 43 has a light emission module 44 and a modulator 47, and the light emission module 44 further includes a light emitter 45 and a driver 46 for driving the light emitter 45.

A modulation signal from the modulator 47 as controlled by the UAV-arithmetic control module 25 is input to the light emission module 44. The driver 46 makes the light emitter 45 to emit a light based on the modulation signal, and thereby the light emission module 44 is subjected to the optical-modulation, and a UAV-data transmitting light 39 with the data superimposed thereon is emitted from the UAV-data transmission module 43.

The data superimposed on the UAV-data transmitting light 39 is the image data acquired by the camera 6, and is the image data associated with a GNSS time acquired from the UAV-GNSS device 27.

In order to perform the photogrammetry, the positional data (the three-dimensional coordinate data) at photographing is associated with the image data, but the association of the image data and the positional data is performed in the TS-arithmetic control module 11 of the total station 2.

The TS-arithmetic control module 11 separates the image data associated with the GNSS time from the UAV-data transmitting light 39, and stores the image data and the measurement data in the TS-storage module 12.

The TS-arithmetic control module 11 extracts the image data stored in the TS-storage module 12 and the measurement data acquired by the total station 2 based on the GNSS time, and performs a photogrammetry based on the identified image data and the measurement data. A result of the photogrammetry is stored in the TS-storage module 12.

Further, during executing of the photogrammetry, the TS-arithmetic control module 11 also determines whether the result of the photogrammetry has abnormalities. Therefore, the determination on the abnormalities of the photogrammetry can be performed substantially in real time.

Further, since the photogrammetry is performed during a flight, the acquisition of the necessary data is completed when the UAV 3 terminated the scheduled flight, and the measurement can be efficiently performed.

In the second embodiment, since the photogrammetry, the data processing of images and the measurement, and the like are performed by the total station 2, a worker can more easily observe a measurement state and a measurement result in real time.

Figure 8:
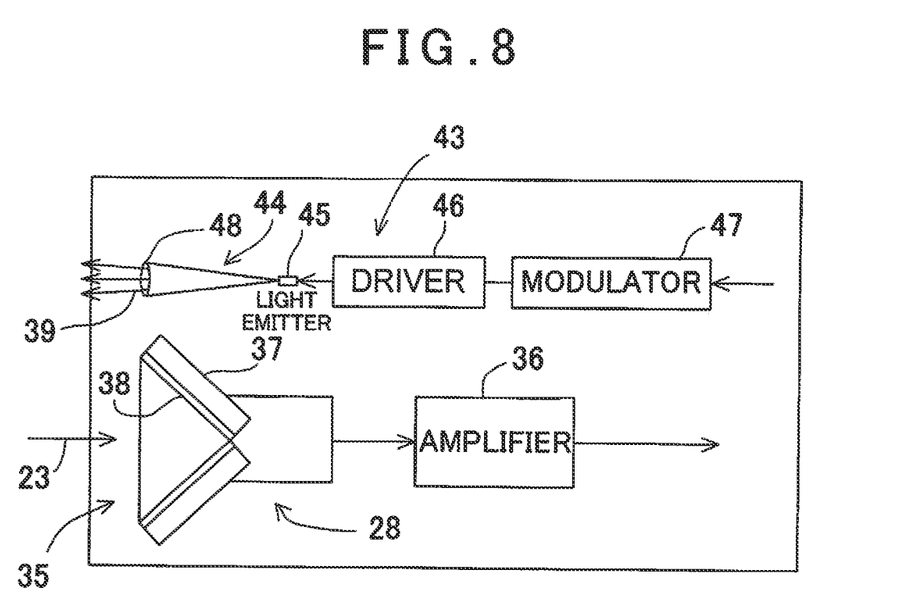
FIG. 8 A schematic drawing of an optical system of the UAV in the second embodiment.
Figure 9:
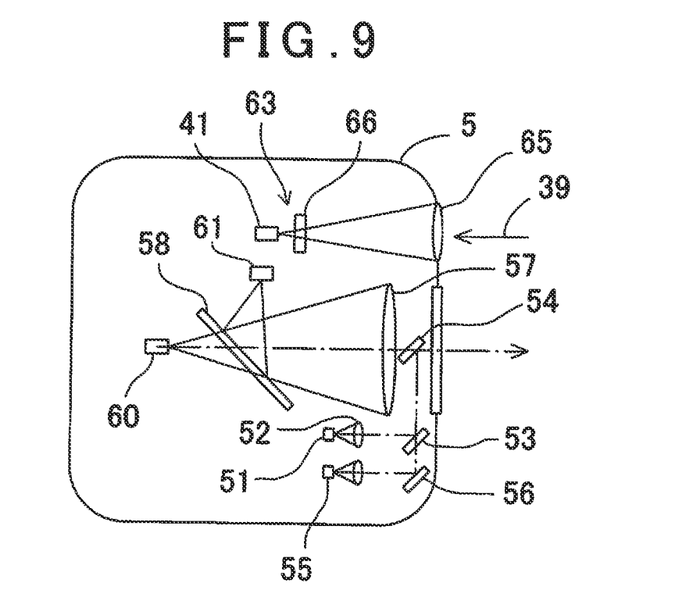
FIG. 9 A schematic drawing of an optical system of the total station in the second embodiment.

FIG. 8 and FIG. 9 show an outline of an optical system in the second embodiment.

FIG. 8 shows a UAV-data transmission module 43 and a photodetector 28 provided on the UAV 3. The photodetector 28 has the same configuration as that of the photodetector 28 shown in FIG. 4.

An optical axis of the UAV-data transmission module 43 is parallel or substantially parallel to an optical axis of a prism module 35.

The light emitter 45 provided on the UAV-data transmission module 43 is driven by the driver 46 based on a modulation signal from the modulator 47, and a UAV-data transmitting light 39 is emitted. The UAV-data transmitting light 39 is turned to a light flux with substantially the same spread (approximately 2 degrees) as a light flux of the tracking light by a condenser lens 48, and projected toward the total station 2.

FIG. 9 shows an optical system of a telescope module 5 (see FIG. 1) of the total station 2.

A distance measuring light emitted from a distance measuring light source 51 is projected to an object to be measured via a lens 52 and mirrors 53 and 54, and the tracking light emitted from a tracking light source 55 is projected to the object to be measured via mirrors 56 and 54. The distance measuring light and the tracking light are projected onto the same optical axis, and the distance measuring light and the tracking light have different wavelengths so as not to interfere with each other.

A reflected distance measuring light and a reflected tracking light reflected on the object to be measured enter a condenser lens 57, and are condensed by the condenser lens 57. The reflected distance measuring light and the reflected tracking light are separated as the reflected distance measuring light and the reflected tracking light by a dichroic mirror 58, the reflected distance measuring light is received by a photodetection element 60, and the reflected tracking light is received by a photodetection element 61.

A data transmitting light photodetection module 63 is provided separately from the above-mentioned distance measurement/tracking optical system.

The data transmitting light photodetection module 63 has an optical axis which is parallel or substantially parallel to an optical axis of the distance measurement/tracking optical system, a photodetection lens 65, a bandpass filter 66, and a photodetection sensor 41 (see FIG. 6) are arranged on the optical axis.

The UAV-data transmitting light 39 enters from the photodetection lens 65, the bandpass filter 66 separates a modulation component from the UAV-data transmitting light 39, and the modulation component enters the photodetection sensor 41. The photodetection sensor 41 emits a photodetection signal and inputs to a demodulator 42 (see FIG. 6).

The signal processing and the like in the demodulator 42 are the same as those in the foregoing embodiment, and hence detailed description is not given here.

Thus, an image signal from the UAV 3 is transmitted to the total station 2.

Figure 10:
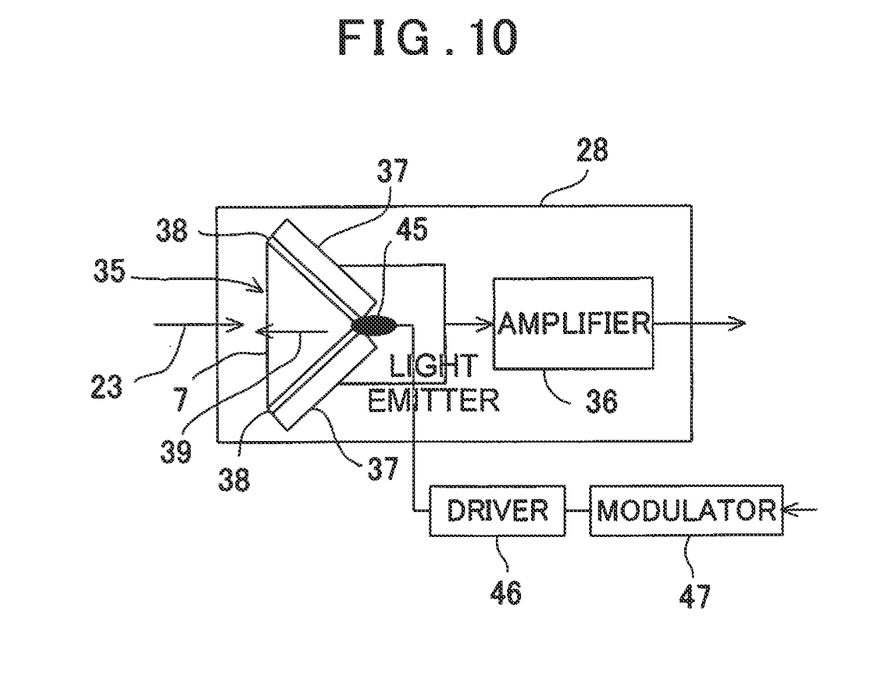
FIG. 10 A block diagram showing another example of the photodetector in the second embodiment.

FIG. 10 shows an embodiment in which a light emitter 45 and a photodetector 28 are integrated.

Figure 4:
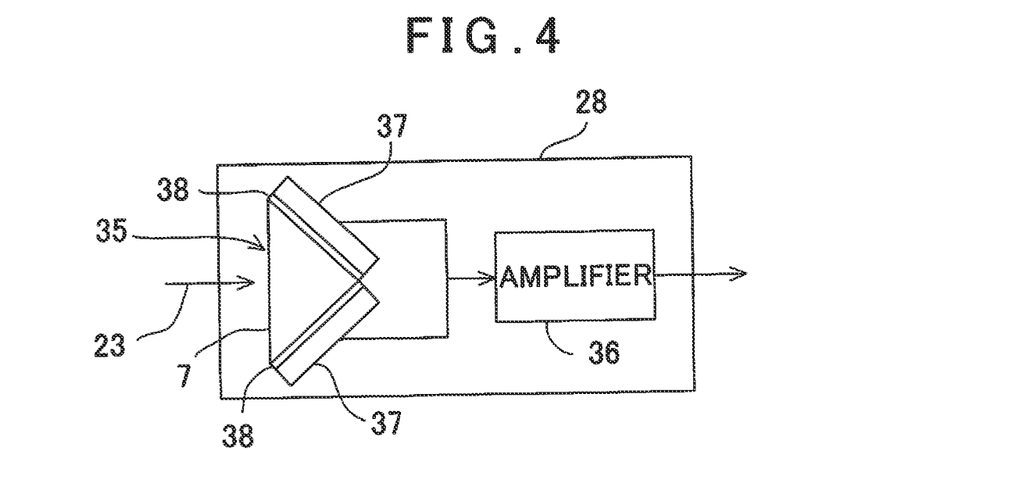
FIG. 4 A block diagram of an example of a photodetector.

It is to be noted that, in FIG. 10, like reference numerals denote parts equal or equivalent to those shown in FIG. 4, and a description thereof will be omitted.

At the center of a prism 7, a light emitter 45 is provided at a boundary position of reflecting surfaces in the drawing. A position of a emitting surface of the photodetection element 45 should be set back from the reflecting surfaces or set back from the boundary position of the reflecting surfaces so as not to block the TS-data transmitting light 23 reflected by the reflecting surface.

The photodetection element 45 is driven by a driver 46 and emits an optically modulated UAV-data transmitting light 39.

Further, the prism 7 retro-reflects the distance measuring light and the tracking light as a reflector, and detects the measurement data superimposed on the tracking light.

The present embodiment has an advantage of being extremely compact and lightweight because the prism 7 as the object to be measured, the photodetection module, and the light emission module 44 are integrated and unified in the prism 7.

REFERENCE SIGNS LIST 1 aerial photogrammetry system
2 total station
3 UAV
5 telescope module
6 camera
7 prism
TS-arithmetic control module
13 distance measuring module
14 tracking module
15 TS-data transmission module
16 angle measuring module
17 TS-GNSS device
21 distance measuring light
22 tracking light
23 TS-data transmitting light
25 UAV-arithmetic control module
27 UAV-GNSS device
28 photodetector
29 flight control module
30 image pickup control module
37 photodetection element
39 UAV-data transmitting light
41 photodetection sensor
42 demodulator
43 UAV-data transmission module
44 light emission module
45 light emitter
47 modulator
51 distance measuring light source
55 tracking light source
58 dichroic mirror
63 data transmitting light photodetection module

The invention claimed is:

1. A flight control system for an unmanned aerial vehicle comprising an unmanned aerial vehicle on which a reflector is mounted and a total station for tracking said reflector and for acquiring measurement data including three-dimensional coordinates of said reflector, wherein said total station emits a tracking light along a tracking optical axis, a distance measuring light and a TS-data transmitting light, and wherein the total station irradiates the tracking light toward said reflector, receives a reflected tracking light from said reflector and performs a tracking of said reflector based on a photodetection position of the reflected tracking light on a photodetector, wherein the total station has an optical axis parallel or approximately parallel to the tracking optical axis for emitting the TS-data transmitting light, and a TS-arithmetic control module, wherein said total station is configured to pulse-emit said tracking light in a predetermined cycle, and has a tracking photodetection shutter which restricts or inhibits a photodetection of the reflected tracking light, wherein said tracking photodetection shutter permits light to be received for a predetermined time from the emission timing of the tracking light, wherein said total station is configured to emit said TS-data transmitting light in a time period from an end of said predetermined time to when a next tracking light is emitted in such a manner that said TS-data transmitting light, said tracking light and said reflected tracking light do not interfere with each other, wherein said unmanned aerial vehicle has a photodetector for receiving said TS-data transmitting light and for emitting a photodetecting signal and a UAV-arithmetic control module for controlling a flight of said unmanned aerial vehicle, and wherein said TS-arithmetic control module is configured to superimpose said measurement data on said TS-data transmitting light, and said UAV-arithmetic control module is configured to separate said measurement data from said photodetecting signal and to obtain a flight position of said unmanned aerial vehicle in real time.

2. The flight control system for the unmanned aerial vehicle according to claim 1, wherein said UAV-arithmetic control module is configured to control the flight of said unmanned aerial vehicle based on three-dimensional coordinates included in said measurement data.

3. The flight control system for the unmanned aerial vehicle according to claim 1, wherein the tracking light is emitted as said TS-data transmitting light in the time period of each emission interval.

4. The flight control system for the unmanned aerial vehicle according to claim 1, wherein said photodetector includes said reflector and has a reflective film formed on a reflection surface of said reflector and for transmitting a part of a light, and a photodetection element for receiving said TS-data transmitting light through said reflective film.

5. A topography measuring system comprising: an unmanned aerial vehicle, on which a reflector and a shape measuring instrument provided at a position known to said reflector are mounted, and a total station for tracking said reflector and for acquiring measurement data including three-dimensional coordinates of said reflector, wherein said total station emits a tracking light along a tracking optical axis, a distance measuring light and a TS-data transmitting light, and wherein the total station irradiates a tracking light along a tracking optical axis toward said reflector, receives a reflected tracking light from said reflector and performs a tracking of said reflector based on a photodetection position of the reflected tracking light on a photodetector, the total station having an optical axis parallel or approximately parallel to the tracking optical axis for emitting a TS-data transmitting light, and a TS-arithmetic control module, wherein said total station is configured to pulse-emit said tracking light in a predetermined cycle, and has a tracking photodetection shutter which restricts or inhibits a photodetection of the reflected tracking light, wherein said tracking photodetection shutter permits light to be received for a predetermined time from the emission timing of the tracking light, wherein said total station is configured to emit said TS-data transmitting light in a time period from an end of the predetermined time to when a next tracking light is emitted in such a manner that said TS-data transmitting light, said tracking light and said reflected tracking light do not interfere with each other, wherein said unmanned aerial vehicle has a photodetector for receiving said TS-data transmitting light and for emitting a photodetecting signal and a UAV-arithmetic control module for controlling a flight of said unmanned aerial vehicle, and wherein said TS-arithmetic control module is configured to superimpose said measurement data on said TS-data transmitting light, said UAV-arithmetic control module is configured to acquire topographical shape data by said shape measuring instrument, and said UAV-arithmetic control module is configured to separate said measurement data from said photodetecting signal, to obtain a position of said shape measuring instrument in real time, to associate the position of said shape measuring instrument with said topographical shape data, and to obtain three-dimensional coordinates of said shape measuring instrument at the time of acquiring said topographical shape data.

6. The topography measuring system according to claim 5, wherein said UAV-arithmetic control module is configured to control the flight of said unmanned aerial vehicle based on three-dimensional coordinates included in said measurement data.

7. The topography measuring system according to claim 5, wherein said total station is configured to pulse-emit a tracking light in a predetermined cycle and to emit said TS-data transmitting light in a time period of each emission interval in such a manner that said TS-data transmitting light does not interfere with the tracking light and a reflected tracking light.

8. The topography measuring system according to claim 7, wherein the tracking light is emitted as said TS-data transmitting light in the time period of each emission interval.

9. The topography measuring system according to claim 5, wherein said photodetector includes said reflector and has a reflective film formed on a reflection surface of said reflector and for transmitting a part of a light, and a photodetection element for receiving said TS-data transmitting light through said reflective film.

10. The topography measuring system according to claim 5, wherein said total station has a TS-GNSS device, said unmanned aerial vehicle has a UAV-GNSS device, wherein said TS-arithmetic control module is configured to obtain a GNSS time at the time of acquiring said measurement data by said TS-GNSS device and to associate said GNSS time with said measurement data, and wherein said UAV-arithmetic control module is configured to obtain a GNSS time at the time of acquiring shape data by said UAV-GNSS device, to associate said GNSS time with said shape data, and to associate said measurement data with said shape data through said GNSS time.

11. The topography measuring system according to claim 5, wherein said shape measuring instrument is a camera for photographing a ground surface, and said UAV-arithmetic control module is configured to perform a photogrammetry based on image data acquired by said camera and on three-dimensional coordinates, as obtained from said TS-data transmitting light, of said camera at the time of acquiring an image.

12. The topography measuring system according to claim 5, wherein said shape measuring instrument is a laser scanner for acquiring point cloud data, and said UAV-arithmetic control module is configured to convert said point cloud data into three-dimensional data of a ground surface system based on said point cloud data acquired by said laser scanner and on three-dimensional coordinates, as obtained from said TS-data transmitting light, of said laser scanner at the time of acquiring said point cloud data.

13. A topography measuring system comprising: an unmanned aerial vehicle, on which a reflector and a shape measuring instrument provided at a position known to said reflector are mounted, and a total station for tracking said reflector and for acquiring measurement data including three-dimensional coordinates of said reflector, wherein said total station emits a tracking light along a tracking optical axis, a distance measuring light and a TS-data transmitting light, and wherein the total station irradiates a tracking light toward said reflector, receives a reflected tracking light from said reflector and performs a tracking of said reflector based on a photodetection position of the reflected tracking light on a photodetector, and a TS-arithmetic control module, wherein said total station is configured to pulse-emit said tracking light in a predetermined cycle, and has a tracking photodetection shutter which restricts or inhibits a photodetection of the reflected tracking light, wherein said tracking photodetection shutter permits light to be received for a predetermined time from the emission timing of the tracking light, wherein said unmanned aerial vehicle has a UAV-data transmission module for emitting a UAV-data transmitting light and a UAV-arithmetic control module for controlling the flight of said unmanned aerial vehicle, wherein said UAV-arithmetic control module is configured to acquire shape data by said shape measuring instrument and to superimpose said shape data on said UAV-data transmitting light, and said TS-arithmetic control module is configured to acquire said shape data from said UAV-data transmitting light, to associate said shape data with the measurement data, and to acquire three-dimensional coordinates of said shape measuring instrument at the time of acquiring said shape data.

14. The topography measuring system according to claim 13, wherein said total station has a TS-GNSS device, said unmanned aerial vehicle has a UAV-GNSS device, said UAV-arithmetic control module is configured to acquire a GNSS time at the time of acquiring said shape data by said UAV-GNSS device and to associate said GNSS time with said shape data, and said TS-arithmetic control module is configured to acquire a GNSS time at the time of acquiring said measurement data by said TS-GNSS device, to associate said GNSS time with said measurement data, and associate said measurement data with said shape data through said GNSS time.

15. The topography measuring system according to claim 13, wherein said shape measuring instrument is a camera for photographing a land surface, and said TS-arithmetic control module is configured to acquire three-dimensional coordinates of said camera at the time of acquiring an image based on said measurement data and to perform a photogrammetry from the image data and said three-dimensional coordinates.

16. The topography measuring system according to claim 13, wherein said shape measuring instrument is a laser scanner for acquiring point cloud data of a land surface, and said TS-arithmetic control module is configured to convert said point cloud data into the three-dimensional data of the land surface system based on said point cloud data and three-dimensional coordinates of said laser scanner as obtained from said measurement data at the time of acquiring said point cloud data.

17. The topography measuring system according to claim 10, wherein said shape measuring instrument is a camera for photographing a ground surface, and said UAV-arithmetic control module is configured to perform a photogrammetry based on image data acquired by said camera and on three-dimensional coordinates, as obtained from said TS-data transmitting light, of said camera at the time of acquiring an image.

18. The topography measuring system according to claim 10, wherein said shape measuring instrument is a laser scanner for acquiring point cloud data, and said UAV-arithmetic control module is configured to convert said point cloud data into three-dimensional data of a ground surface system based on said point cloud data acquired by said laser scanner and on three-dimensional coordinates, as obtained from said TS-data transmitting light, of said laser scanner at the time of acquiring said point cloud data.

* * * * *